US010915602B2

United States Patent
Nagarajan

(10) Patent No.: US 10,915,602 B2
(45) Date of Patent: Feb. 9, 2021

(54) AUTOMATIC DETECTION OF OUTLIERS IN MULTIVARIATE DATA

(71) Applicant: ENTIT SOFTWARE LLC, Sunnyvale, CA (US)

(72) Inventor: Lakshmi Nagarajan, Singapore (SG)

(73) Assignee: Micro Focus LLC, Santa Clara, CA (US)

( * ) Notice: Subject to any disclaimer, the term of this patent is extended or adjusted under 35 U.S.C. 154(b) by 744 days.

(21) Appl. No.: 15/553,278

(22) PCT Filed: Mar. 18, 2015

(86) PCT No.: PCT/US2015/021284
§ 371 (c)(1),
(2) Date: Aug. 24, 2017

(87) PCT Pub. No.: WO2016/148713
PCT Pub. Date: Sep. 22, 2016

(65) Prior Publication Data
US 2018/0046599 A1   Feb. 15, 2018

(51) Int. Cl.
*G06F 17/00* (2019.01)
*G06F 17/18* (2006.01)
*G06N 3/08* (2006.01)

(52) U.S. Cl.
CPC ............. *G06F 17/18* (2013.01); *G06N 3/08* (2013.01)

(58) Field of Classification Search
CPC .................................. G06F 17/18; G06N 3/08
USPC ........................................................ 702/179
See application file for complete search history.

(56) References Cited

U.S. PATENT DOCUMENTS

| 6,341,257 B1 | 1/2002 | Haaland |
| 8,640,015 B2 | 1/2014 | Ide et al. |
| 9,355,071 B2* | 5/2016 | King ................... G06F 17/18 |
| 2009/0012723 A1 | 1/2009 | Treado et al. |

(Continued)

OTHER PUBLICATIONS

Semmar et al., Independent-Model Diagnostics for a Priori Identification and Interpretation of Outliers from a Full Pharmacokinetic Database: Correspondence Analysis, Mahalanobis Distance and Andrews Curves, J Pharmacokinet Pharmacodyn, vol. 35, pp. 159-183 (Year: 2008).*

(Continued)

*Primary Examiner* — Toan M Le
*Assistant Examiner* — Xiuqin Sun

(57) ABSTRACT

Automatic detection of outliers in multivariate data is disclosed. One example is a system including a distance generator to determine Mahalanobis distances for data elements of multivariate input data, the Mahalanobis distance of a given data element indicative of a measure of distance of the given data element from a probability distribution associated with the input data. A filter module selects a portion of the input data, the cohesive portion indicative of cohesive data elements, and the selection based on minimizing the Mahalanobis distances, and identifies candidate outliers to be data elements not in the cohesive portion. An outlier detector automatically detects outliers of the candidate outliers, the detection based on median absolute deviations of the Mahalanobis distances of the input data, and a modified z-score. A display module generates a visual representation of the detected outliers.

20 Claims, 4 Drawing Sheets

(56) References Cited

U.S. PATENT DOCUMENTS

| | | | |
|---|---|---|---|
| 2011/0288836 A1* | 11/2011 | Lacaille | G05B 23/0254 |
| | | | 703/2 |
| 2013/0096878 A1* | 4/2013 | Lotjonen | G06K 9/6265 |
| | | | 702/181 |
| 2014/0058763 A1 | 2/2014 | Zizzamia et al. | |
| 2014/0330519 A1 | 11/2014 | Mueller et al. | |
| 2015/0294052 A1* | 10/2015 | Urmanov | G06F 17/18 |
| | | | 703/2 |

OTHER PUBLICATIONS

Jayshree S. Gosavi et al., 'Unsupervised Distance-Based Outlier Detection Using Nearest Neighbours Algorithm on Distributed Approach: Survey', IJIRCCE, Dec. 2014, vol. 2, Issue 12; See pp. 1-5.(http://www.ijircce.com/upload/2014/december/41_Unsupervised.pdf).

Zhang, X. et al.; "Effective Fault Detection & Isolation Using Bond Graph-based Domain Decomposition"; Jun. 10-12, 2009; http://ieeexplore.ieee.org/xpl/login.jsp?tp=&arnumber=5160134&url=http%3A%2F%2Fieeexplore.ieee.org%2Fstamp%2Fstamp.jsp%3Farnumber%3D5160134.

Riani, M. et al. ; "Finding an Unknown Number of Multivariate Outliers"; Jul. 2008; http://www.riani.it/pub/rac09-jrssb.pdf.

Lu, Y-C. et al.; "A Generalized Student-t Based Approach to Mixed-type Anomaly Detection"; Apr. 26, 2013; http://www.aaai.org/ocs/index.php/AAAI/AAAI13/paper/viewFile/6266/7222.

Sivia Cateni et al., 'Data processing for outliers detection', In book: Pattern Recognition: Methods and Application, Chapter 1, Oct. 2013 (http://www.researchgate.net/publication/235349950) See pp. 1-18.

Sreevidya S. S. et al., 'A Survey on Outlier Detection Methods', IJCSIT, 2014, vol. 5 (6); See pp. 1-4. (http://www.ijcsit.com/docs/Volume205/vol5issue06/ijcsit20140506280.pdf).

International Search Report and Written Opinion; PCT/US2015/021284; dated Jan. 4, 2016; 9 pages.

* cited by examiner

AUTOMATIC DETECTION OF OUTLIERS IN MULTIVARIATE DATA

BACKGROUND

Outliers are points in a dataset that are distant from other observations. Outlier analysis finds utility in applications related to fraud detection, production quality control, network attack detection, and so forth. It is also useful in machine learning algorithms such as linear regression, logistic regression, neural networks and others.

DETAILED DESCRIPTION

Figure 1:
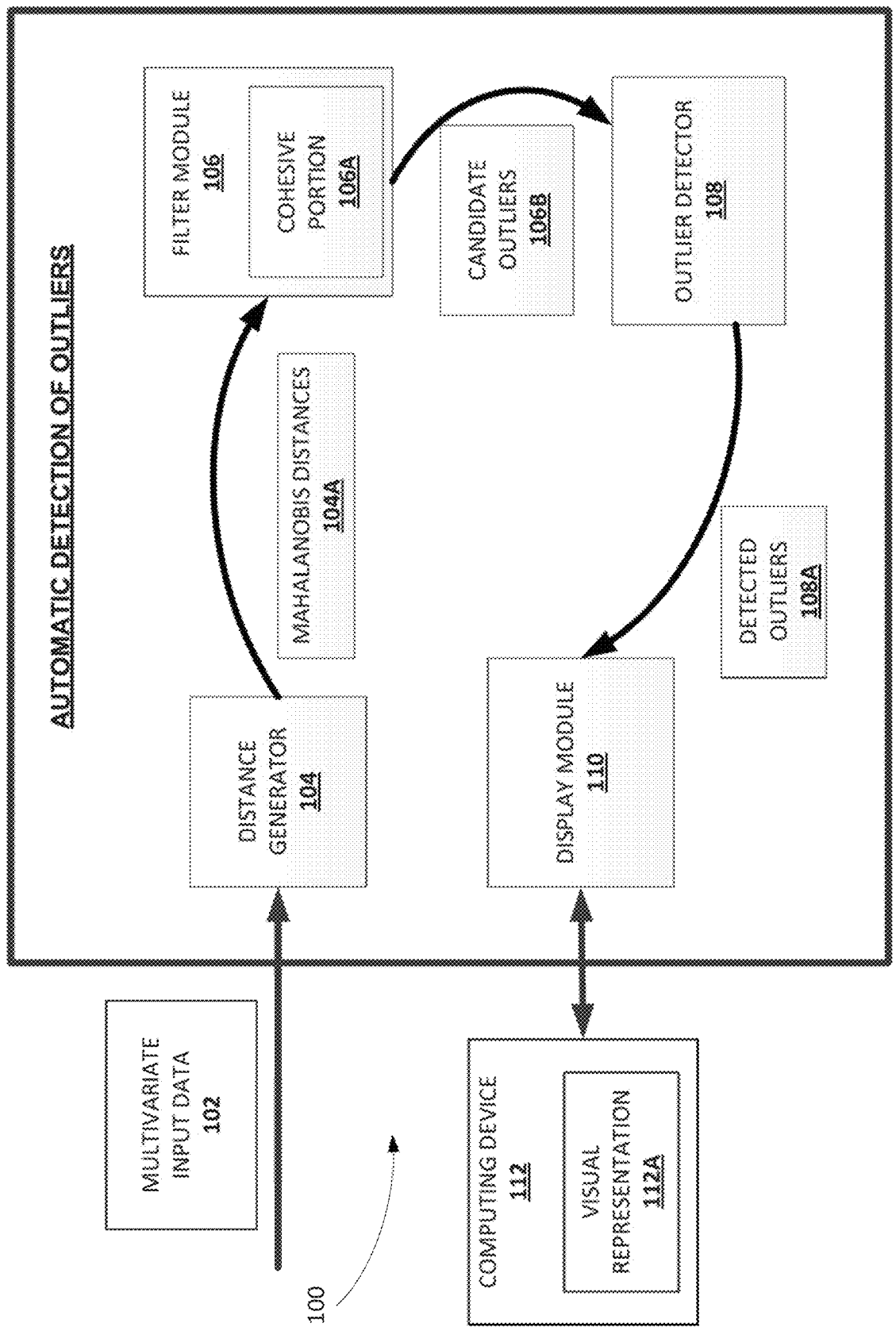
FIG. 1 is a functional block diagram illustrating one example of a system for automatic detection of outliers in multivariate input data.

An outlier May occur due to a measurement difference in a proper observation. In such instances, it may be important to identify the outlier to analyze the underlying cause that resulted in the measurement difference. An outlier may also occur due to an observation recording error. In such instance, it may be pertinent to filter out the outlier from the dataset prior to performing analysis on the dataset. In many real-world applications, such as for example, in machine learning algorithms, presence of an outlier may cause an erroneous fit or classification.

Existing techniques to find outliers may include statistical methods, depth based methods, deviation based methods, distance based methods and/or density based methods. Such techniques generally make limiting assumptions on the underlying dataset. For example, some techniques may assume that the dataset has a Gaussian distribution. Also, for example, some techniques may assume that the dataset comprises one dimensional data. As another example, some techniques may require an a priori estimate of an expected number of outliers in the dataset. However, real-world datasets may generally not be endowed with, a Gaussian distribution, may not be univariate, and/or may not be amenable to an a priori estimation of the expected number of outliers.

For example, measurements of a finished phone in a phone manufacturing plant may be a dataset with at least 4 dimensions representing length, width, thickness and screen size of the phone. A quality control expert may be interested in determining if all phones in one lot conform to standard specifications. A phone may be identified as defective, or as an outlier among the manufactured phones, if any one of a combination of the four dimensions is not in an expected range. The quality control expert may be interested in performing outlier analysis on the manufactured phones to find out which phones are defective. However, the quality control expert may or may not know the number of outliers to expect among the manufactured phones.

In some examples, the quality control expert may be expected to use domain expertise to predict an expected number of potentially defective phones. However, the number of outliers among the manufactured phones may be higher than expected based on several unexpected and/or unforeseen factors, such as, for example, machine malfunction, power outage, defective shipment of supplies, and so forth. Accordingly, there is a need for an outlier detection algorithm that may automatically detect the number of defective phones among the manufactured phones, without an input related to the expected number of defective phones.

As described herein, an outlier detection system is described to detect outliers in multivariate datasets, with no limitations as to the underlying statistical distribution, and/or without an a priori estimation of the expected number of outliers. The outlier detection system described herein is generally based on a combination of two techniques. A distance based model is used to structure input data, and a statistical method is applied to detect outliers based on distances in the structured input data.

As described in various examples herein, automatic detection of outliers in multivariate input data. One example is a system including a distance generator, a filter module, an outlier detector, and a graphical user interface. The distance generator determines Mahalanobis distances for data elements of multivariate input data, the Mahalanobis distance of a given data element indicative of a measure of distance of the given data element from a probability distribution associated with the input data. The filter module selects a portion of the input data, the cohesive portion indicative of cohesive data elements, and the selection based on minimizing the Mahalanobis distances, and identifies candidate outliers to be data elements not in the cohesive portion. The outlier detector automatically detects outliers of the candidate outliers, the detection based on median absolute deviations of the Mahalanobis distances of the input data, and a modified z-score. The display module generates a visual representation of the detected outliers.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for automatic detection of outliers in multivariate input data. System 100 is shown to include a distance generator 104, a filter module 106, an outlier detector 108, and a display module 110. The distance generator 104, filter module 106, outlier detector 108, and display module 110 are communicatively linked to one another via a network.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the Internet, part of an intranet, and/or any other type of network. In some examples, the network may be a secured network.

System 100 receives multivariate input data 102. Generally, multivariate input data 102 includes a plurality of data elements, where each data element further comprises multiple data components for variables, dimensions, features, categories, etc.). The term "multivariate" as used herein, refers to a data element with more than one variable. For example, a data element may represent stock price values for, a company for 30 days. Accordingly, the data element may comprise 30 data components, each component representing an average daily stock price for each of the 30 days. In some examples, the data element may be a vector, and multivariate may refer to a vector with more than one dimension.

In some examples, the multivariate input data 102 may comprise numerical data. In some examples, non-numerical components of the multivariate input data 102 may be filtered out to generate purely numerical data. In some examples, non-numerical components of the multivariate input data 102 may be modified to generate purely numerical data. For example, the data element may represent an individual, and the data components may be categorical data that represent presence or absence of major illnesses such as heart disease, diabetes, depression, high blood pressure, and so forth. Accordingly, the data element may be modified to generate numerical data by representing presence of an illness by "1" and by representing absence of an illness by "0".

The multivariate input data 102 may be received from a variety of sources. For example, the multivariate input data 102 may be obtained from a database that stores such data. In some examples, the database may be publicly available databases such as databases available at the Centers for Disease Control. In some examples, the database may be a secured database, such as, for example, a patient database from a hospital. In some examples, the multivariate input data 102 may be data that has been obtained from the internet, such as, for example, a company's stock price over a period of time. In some examples, the multivariate input data 102 may be data that is received in substantially real-time from a network security system, where the multivariate input data 102 comprises log messages related to security events. In some examples, the multivariate input data 102 may be received by the distance generator 104. In some examples, the multivariate input data 102 may be streaming data that is progressively analyzed as it streams in. System 100 may analyze such data and provide real-time insights to a subject matter expert ("SME") or a domain expert.

As used herein, an SME may be an individual in possession of domain knowledge. For example, the domain may be a retail store, and the SME may be the store manager. Also, for example, the domain may be a hospital, and the SME may be a member of the hospital management staff. As another example, the domain may be a casino, and the SME may be the casino manager. Also, for example, the domain may be a secure office space, and the SME may be a member of the security staff.

A domain, as used herein, may be an environment associated with the input data 102, and domain knowledge may be semantic and/or contextual criteria relevant to aspects, of the domain. For example, the input data 102 may be representative of Web navigation logs (e.g. click stream), and the domain may be the domain name servers that are visited via the navigation logs, and the domain knowledge may be semantic and/or contextual criteria relevant to analysis of internet traffic. Also, for example, the input data 102 may be related to operational or security logs, and the domain may be a secure office space for which the security logs are being maintained and/or managed, and the domain knowledge may be semantic and/or contextual criteria relevant to tracking security logs based on preferences such as location, time, frequency, error logs, warnings, and so forth.

The distance generator 104 determines Mahalanobis distances 104A for data elements of the multivariate input data 102, the Mahalanobis distance of a given data element indicative of a measure of distance of the given data element from a probability distribution associated with the multivariate input data 102. The Mahalanobis distance may be applied to multivariate data, such as multivariate input data 102. Generally, the Mahalanobis distance incorporates non-trivial correlations in the multivariate input data 102. Generally, determination of the Mahalanobis distances 104A transforms the multivariate input data 102 to univariate data.

The probability distribution associated with the multivariate input data 102 may be any distribution of the multivariate input data 102. In some examples, the probability distribution may be Gaussian. In some examples, the probability distribution may be normal. In some examples, the distance generator 104 may determine the probability distribution. In some examples, the multivariate input data 102 and the associated probability distribution may be received by system 100.

More formally, for a multivariate input data 102 where each data element has n components, the Mahalanobis distance for a data element $x=(x_1, x_2, \ldots, x_n)$ may be determined by:

$$M.D.(x) = \left[ (x-\mu)^T \sum\nolimits^{-1} (x-\mu) \right]^{\frac{1}{2}} \quad \text{(Eqn. 1)}$$

where M. D. is the Mahalanobis distance, $\mu$ is a mean vector for the probability distribution, and $\Sigma$ is a covariance matrix associated with the multivariate input data 102. Generally, for a data element with n dimensions, the mean vector is an n-dimensional vector, and the covariance matrix is a n×n matrix.

In some examples, the distance generator 104 determines the Mahalanobis distances 104A based on a selected sub-plurality of variables of the multivariate input data 102. For example, the input data 102 may include data elements related to healthcare data. Each data element may include variables or components that represent presence or absence, of major illnesses such as heart disease, diabetes, depression, high blood pressure, liver disease, stroke, and so forth. Based on factors, such as for example, input from an SME, the distance generator 104 may select the variables related to heart disease, diabetes, and stroke as the sub-plurality of variables of the multivariate input data 102, and determine the Mahalanobis distances 104A based on the selected sub-plurality of variables. Also, for example, the data elements of the multivariate input data 102 may include variables that do not include numerical data. In such instances, the distance, generator 104 may select the variables that include numerical data, and determine the Mahalanobis distances 104A based on the selected sub-plurality of variables.

In some examples, the input data 102 may be categorical data, and the distance generator 104 may convert the categorical data to numerical data. For example, as described herein, data elements with categorical data related to presence or absence of an illness may be modified to generate numerical data by representing presence of an illness by "1" and by representing absence of an illness by "0".

The filter module 106 may select a cohesive portion 106A of the multivariate input data 102 based on minimizing the Mahalanobis distances 104A, and identify candidate outliers 106B to be data elements not in the cohesive portion 106A. Generally, the filter module 106 filters data elements that are "normal" (or non-extreme, expected, and/or unremarkable) in the probability distribution of the input data 102, and may be able to select candidate outliers that may be representative of rare situations that are distinctly different from such normal data elements.

Generally, mean µ of the probability distribution, and covariance matrix associated with the multivariate input data 102 may be affected by outliers of the probability distribution. Accordingly, the Mahalanobis distances 104A may also be affected by outliers because they depend on the mean p of the probability distribution, and the covariance matrix associated with the multivariate input data 102, as indicated by Eqn. 1. Accordingly, in some examples, the filter module 106 may select the cohesive portion 106A of the input data 102 based on a minimum covariance determinant method.

Generally, the minimum covariance determinant method refers to a highly robust estimator of multivariate location and scatter. The minimum covariance determinant method identifies a sub-collection of data elements of input data 102, where the data elements in the sub-collection have a covariance matrix with a minimum determinant. The determinant of a covariance matrix is indicative of scatter, and therefore, a minimum determinant is indicative of minimum scatter. Accordingly, the minimum covariance determinant method may identify data elements that are proximate to each other with respect to their respective Mahalanobis distances. Generally, a covariance matrix may not be dependent on the number of points, but only on the number of dimensions. Covariance measures how much the data elements of the input data change with respect to one another. In some examples, the multivariate input data 102 may comprise vectors such as $X=(x_1, x_2, \ldots, x_N)$, and $Y=(y_1, y_2, \ldots, y_N)$. A covariance matrix, C, for X and Y may be determined, where the $ij^{th}$ element of matrix C is:

$$C_{ij}=\text{cov}(x_i,y_j). \quad$$

In some examples, using a sample size of 90% of the input data 102, a cohesive portion 106A of points in the dataset may be identified. The remaining 10% of the input data 102 may be selected as the candidate outliers 106B. In other examples, a different portion of the input data 102 may be selected as the candidate outliers 106B. Generally, based on empirical estimates, the candidate outliers 106B may be determined to have a high probability of including outliers.

In some examples, the minimum covariance determinant method may be iterative. For example, a mean and variance of a first sample $S_1$ comprising 90% of the input data 102 may be determined. Mahalanobis distances of the input data 102 may be computed based on the mean and variance of the first sample $S_1$. The Mahalanobis distances may be sorted and 90% of data elements of input data 102 may be selected as a second sample, $S_2$, based on minimum Mahalanobis distances. If the data elements in the second sample $S_2$ have Mahalanobis distances less than Mahalanobis distances of data elements in the first sample $S_1$, determined in a previous step, then the second sample $S_2$ may be selected as a new collection that minimizes Mahalanobis distances. The process may be continued iteratively, until Mahalanobis distances of a selected 90% of data elements in a k-th sample $S_k$ are the same as Mahalanobis distances of a selected 90% of data elements in a prior (k−1)-st sample $S_{k-1}$ of the iterative process. Such a stable 90% of input data (e.g., sample $S_k$, or $S_{k-1}$ may be selected as, the cohesive portion 106A.

In some examples, such an iterative process of selecting the cohesive portion 106A may be repeated several times to minimize sampling error, and to select an optimal sample of 90% of input data as the cohesive portion 106A. For example, the process may be repeated 500 times to select the cohesive portion 106A. In some examples, the number of repetitions may be input by a user via a computing device 112.

The outlier detector 108 automatically detects outliers 108A of the candidate outliers 106B, the detection based on median absolute deviations (M.A.D.) of the Mahalanobis distances of the input data 102, and a modified z-score. Generally, the M.A.D. of a univariate sample of quantitative data is a robust measure of variability of the univariate sample. As described herein, the Mahalanobis distances 104A transform the multivariate input data 102 to one-dimensional distances. The median absolute deviation may be computed for such one-dimensional data.

In some examples, the M.A.D. of the Mahalanobis distances 104A, represented as, M.A.D. (X), may be determined as:

$$\text{M.A.D.}(X)=\text{median}(\text{abs}(X-\text{med}(X))) \quad \text{(Eqn. 2)}$$

where med(X) is a median of the Mahalanobis distances 104A, represented here as "X", and abs(y) denotes the absolute value or norm of the quantity y.

Generally, the modified z-score is based on the M.A.D. (X). In some examples, the modified z-score may be based on Mahalanobis distances of the candidate outliers 106B. More formally, the modified z-score may be determined as:

$$M_i = \frac{C(\text{abs}(x_i - \text{med}(X)))}{M.A.D(X)} \quad \text{(Eqn. 3)}$$

where abs(y) denotes the absolute value or norm of the quantity y, and $M_i$ is the modified z-score for a data element i of the candidate outliers 108B, where $x_i$ denotes the Mahalanobis distance of the data element a, and C is a constant. In some examples, the constant C may 0.6745. Generally, the constant C may depend on domain knowledge. For example, an SME may provide the constant C the computing device 112.

In some examples, the outlier detector 108 may detect the outliers 108A based on an adjustable threshold. For example, the probability distribution associated with the input data is a normal distribution, and the adjustable threshold may be 3.5, and the outlier detector 108 may identify any data element $x_i$ of the candidate outliers 106B satisfying $M_i>3.5$ as a detected outlier 108A. In some examples, the adjustable threshold may be provided with the input data 102. In some examples, the adjustable threshold may depend on the input data 102. In some examples, the adjustable threshold may be provided by an SME via the computing device 112. In some examples, the detected outliers 108A may be determined interactively, based on adjustments to the adjustable threshold. For example, decreasing the value of the adjustable threshold may increase the number of detected outliers 108A, whereas increasing the value of the adjustable threshold may decrease the number of detected outliers 108A. System 100 may interact with an external analytics system, receive a first adjustable threshold, provide a first set of detected outliers, receive a second adjustable threshold, provide a second set of detected outliers, and so forth.

The display module 110 generates a visual representation 112A of the detected outliers 108A. In some examples, the display module 110 provides the visual representation 112A to a computing device 112 for display. In some, examples, the visual representation 112A may be interactive, and the display module 110 may provide the visual representation 112A to the computing device 112 via an interactive graphical user interface. For example, the display module 110 may be an anomaly processor that provides an interactive visual representation 112A to analyze anomalies in the input data 102. In some examples, the anomaly processor may detect the outliers 108A and generate the interactive visual representation 112A of the input data 102, the cohesive portion 106A of the input data 102, and the detected outliers 108A.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated visualization function.

For example, the distance generator 104 may be a combination of hardware and programming for performing a designated function. For example, the distance generator 104 may include programming to receive the input data 102, and perform data pre-processing, on the input data 102. In some examples, the distance generator 104 may include programming to identify a probability distribution associated with the input data 102. In some examples, the distance generator 104 may include programming to determine the Mahalanobis distances 104A for data elements of the multivariate input data 102. The distance generator 104 may include hardware to physically store the Mahalanobis distances 104A.

As another example, the filter module 106 may include software algorithms to select a cohesive portion 106A, and candidate outliers 106B of the multivariate input data. For example, the filter module 106 may include software algorithms to perform steps of a minimum covariance determinant method. Also, for example, the filter module 106 may include hardware to physically store the cohesive portion 108A of the input data 102, and processors to physically process the cohesive portion 108A.

As another example, the outlier detector 108 may include hardware to store detected outliers 108A. The outlier detector 108 may include software programming to automatically detect outliers 108A. The outlier detector 108 may include software programming to compute the M.A.D. and the modified xr score. The outlier detector 108 may include software programming to dynamically interact with the other components of system 100 to receive the candidate outliers 1066 of the input data 102 from the filter module 106, and provide the detected outliers 108A to the display module 110.

Likewise, the display module 110 may include a combination of hardware and software programming. For example, the display module 110 may include hardware to store parameters needed to generate the visual representation 112A. The display module 110 may include software programming to, generate the visual representation 112A. Also, for example, the display module 110 may include hardware to be communicatively linked to the computing device 112 to provide interactive graphical user interfaces.

In some examples, the display module 110 may include software programming to interact with SMEs via the computing device 112. In some examples, the display module 110 may include software programming to interactively interact with SMEs via the computing device 112 to receive adjustable thresholds, and iteratively modify the detected outliers 108A based on the adjustable threshold.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, the computing device 112 may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. Computing device 112 may include a processor and a computer-readable storage medium.

Figure 2:
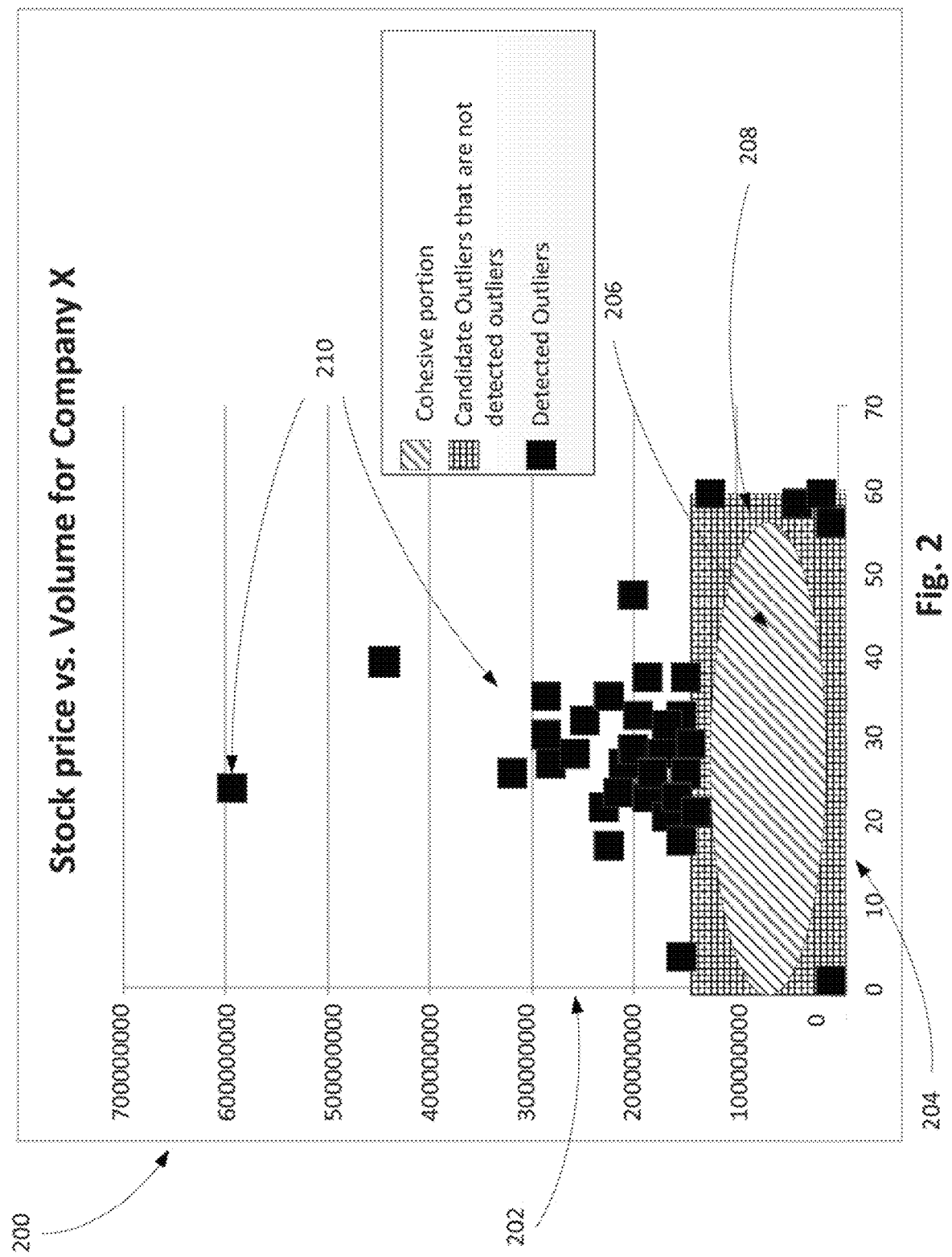
FIG. 2 is an example visual representation of detected outliers.

FIG. 2 is an example visual representation 200 of detected outliers. The multivariate input data is data related to the stock price and trade volume for Company X over a predetermined period of time. The horizontal axis 204 represents the stock price for Company X, and the vertical axis 202 represents the trade volume for Company X. As indicated, the multivariate input data may be represented in three regions, a cohesive portion 206, candidate outliers that are not detected outliers 208, and detected outliers 210. Together, the three regions represent the multivariate input data. In the example illustrated herein, the multivariate input data may include 7238 data elements (or records). The cohesive portion 206 represents the portion of the input data selected based on, for example, a minimum covariance determinant method. The candidate outliers that are not detected outliers 208 and the detected outliers 210 together represent the candidate outliers of the input data. In the example illustrated herein, the candidate outliers of the input data comprise 10% of the input data, or 720 data elements. Finally, the detected outliers 210 represent the automatically detected outliers of the candidate outliers. In the example illustrated herein, the detected outliers comprise 62 data elements. Accordingly, the cohesive portion 206 represents 90% of the input data, the candidate outliers represent 10% of the input data, and the detected outliers 210 represent the detected outliers of the candidate outliers. As described herein, in some examples, the cohesive portion 206 may be determined based on an iterative minimum covariance determinant method.

Figure 3:
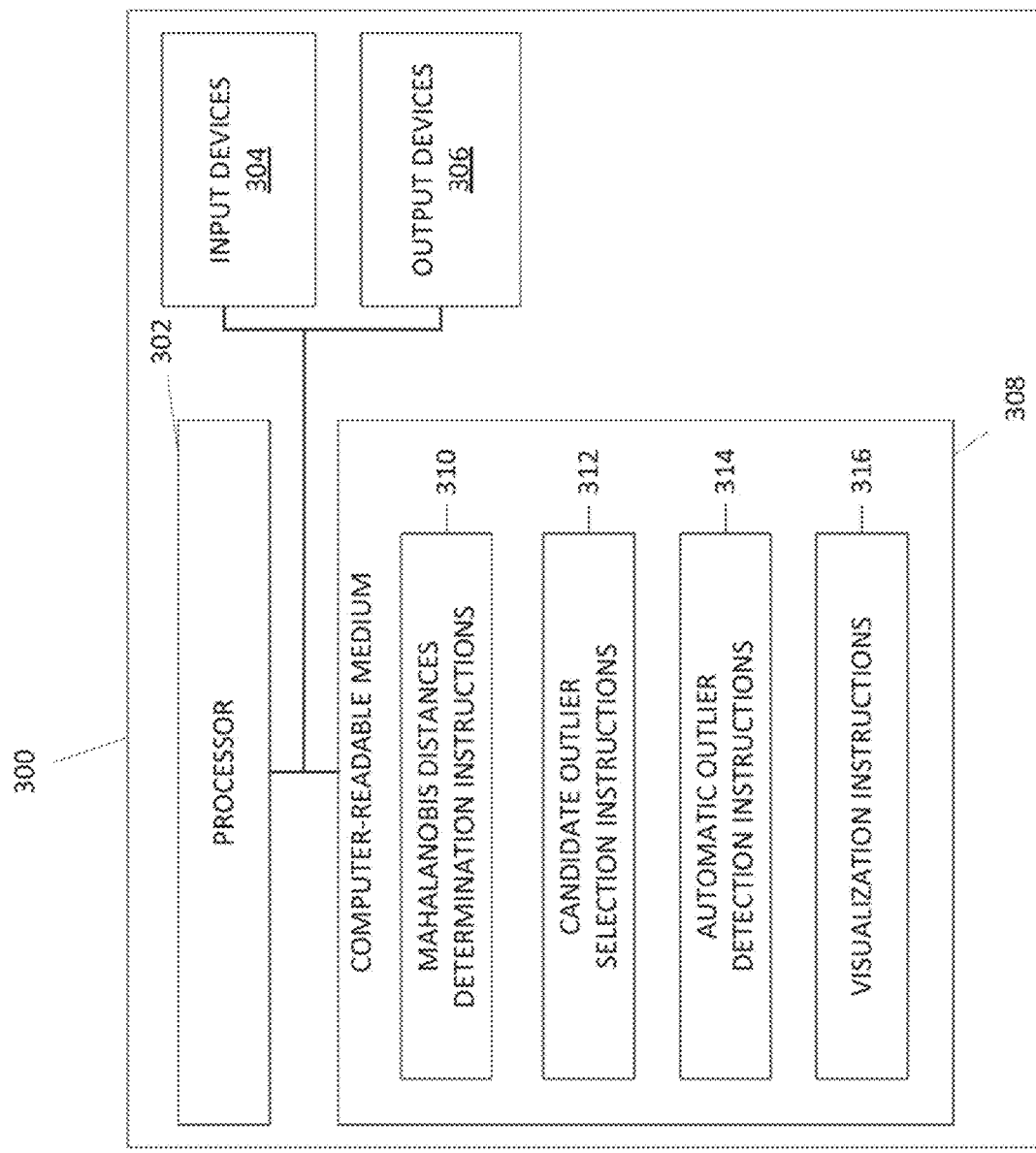
FIG. 3 is a block diagram illustrating one example of a computer readable medium for automatic detection of outliers in multivariate input data.

FIG. 3 is a block diagram illustrating one example of a computer readable medium for automatic detection of outliers in multivariate input data. Processing system 300 includes a processor 302, a computer readable medium 308, input devices 304, and output devices 306. Processor 302, computer readable medium 308, input devices 304, and output devices 306 are coupled to each other through a communication link (e.g., a bus).

Processor 302 executes instructions included in the computer readable medium 308. Computer readable medium 308 includes Mahalanobis distance determination instructions 310 to determine Mahalanobis distances for data elements of multivariate input data, the Mahalanobis distance of a given data element indicative of a measure of distance of the given data element from a probability distribution associated with the input data.

Computer readable medium 308 includes candidate outlier selection instructions 312 to select a cohesive portion of the input data by minimizing Mahalanobis distances (e.g., based on a minimum covariance determinant method), and to identify candidate outliers to be data elements not in the cohesive portion.

Computer readable, medium 308 includes automatic outlier detection instructions 314 to automatically detect outliers of the candidate outliers, the detection based on median absolute deviations of the Mahalanobis distances of the input data, and a modified z-score.

Computer readable medium 308 includes visualization instructions 316 to generate and/or provide a visual representation of the detected outliers to a computing device via a graphical user interface.

Input devices 304 include a keyboard, mouse, data ports, and/or other suitable devices for inputting information into processing system 300. In some examples, input devices 304, such as a computing device, are used by the interaction processor to receive an adjustable threshold. Output devices 306 include a monitor, speakers, data ports, and/or other suitable devices for outputting information from processing system 300. In some examples, output devices 306 are used to provide the visual representation of the detected outliers.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 308 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks: other magnetic media including tape; optical media such as compact disks (CDs) or digital video disks (DVDs); or other types of storage devices.

As described herein, various components of the processing system 300 are identified and refer to a combination of hardware and programming configured to perform a designated visualization function. As illustrated in FIG. 3, the programming may be processor executable instructions stored on tangible computer readable medium 308, and the hardware may include processor 302 for executing those instructions. Thus, computer readable medium 308 may store program instructions that, when executed by processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 4:
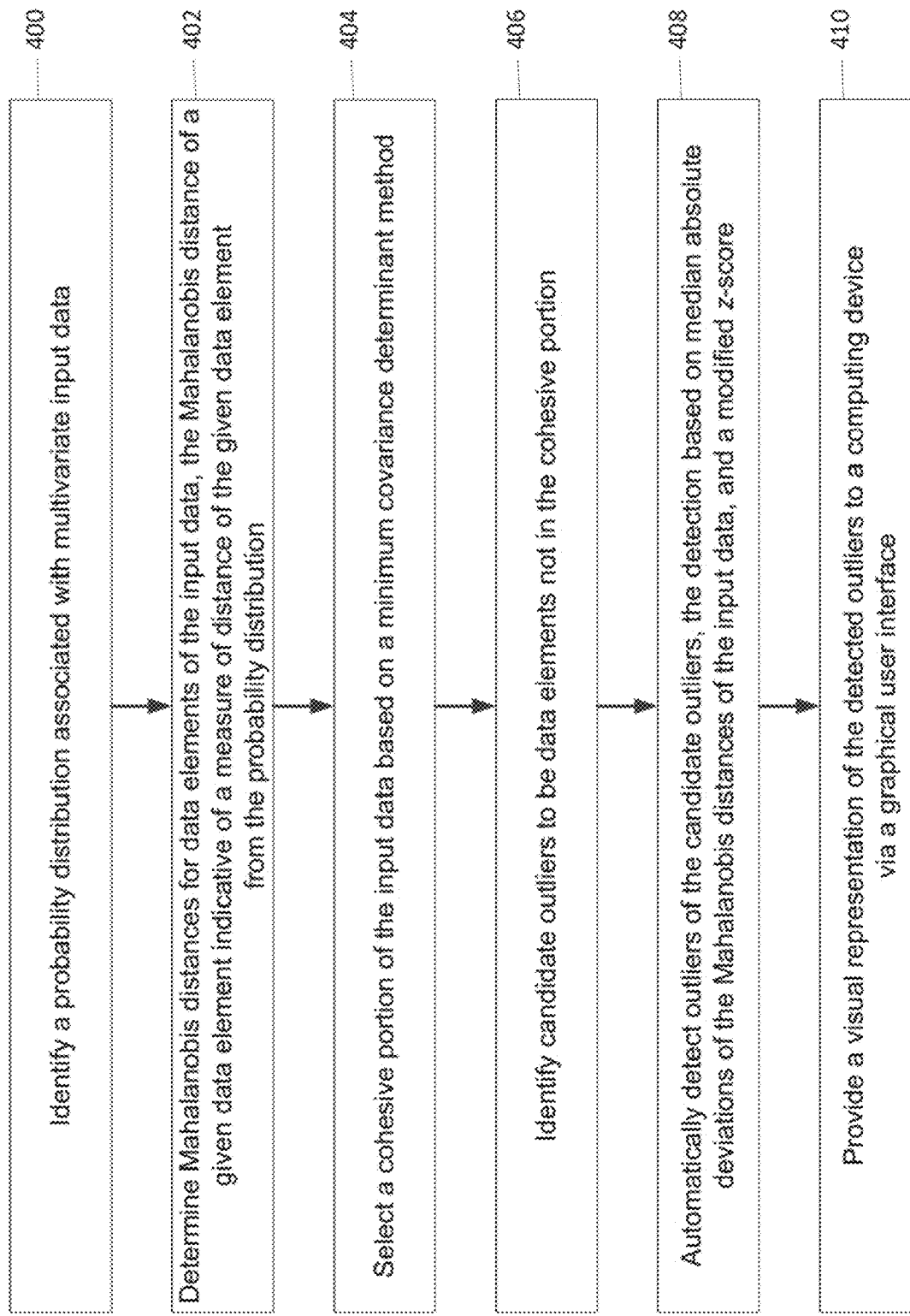
FIG. 4 is a flow diagram illustrating one example of a method for automatic detection of outliers in multivariate input data.

Computer readable medium 308 may be any of a number of memory components capable of storing instructions that can be executed by Processor 302. Computer readable medium 308 may be non-transitory in the sense that it does not encompass a transitory signal but instead is made up of one or more memory components configured to store the relevant instructions. Computer readable medium 308 may be implemented in a single device or distributed across devices. Likewise, processor 302 represents any number of processors capable of executing instructions stored by computer readable medium 308. Processor 302 may be integrated in a single device or distributed across devices. Further, computer readable medium 308 may be fully or partially integrated in the same device as processor 302 (as illustrated), or it may be separate but accessible to that device and processor 302. In some examples, computer readable medium 308 may be a machine-readable storage medium FIG. 4 is a flow diagram illustrating one example of a method for automatic detection of outliers i multivariate input data. At 400, a probability distribution associated with multivariate input data may be identified. At 402, Mahalanobis distances for data elements of the input data may be determined, the Mahalanobis distance of a given data element indicative of a measure of distance of the given data element from the probability distribution. At 404, a cohesive portion of the input data may be selected based, on median absolute deviations of the Mahalanobis distances. At 406, candidate outliers may be identified to be data elements not in the cohesive portion. At 408, outliers of the candidate outliers may be automatically detected, the detection based on median absolute deviations of the Mahalanobis distances of the input data, and a modified z-score. At 410, a visual representation of the detected outliers may be provided to a computing device via a graphical user interface.

In some examples, the candidate outliers may comprise 10% of the input data.

In some examples, the probability distribution associated with the input data may be a Gaussian distribution.

In some examples, detecting outliers of the candidate outliers may be based on an adjustable threshold.

In some examples, the input data may be categorical data, and the method may further include converting the categorical data to numerical data.

In some examples, the method may further include determining Mahalanobis distances based on a selected sub-plurality of variables of the multivariate input data.

In some examples, the visual representation may be interactive, and the method may further include providing the visual representation to the computing device via a graphical user interface.

Examples of the disclosure provide a generalized system for automatic detection of outliers in multivariate input data. The generalized system provides an approach for detection of outliers in a wide array of data sets with no limitations as to the underlying statistical distribution, and/or without an a priori estimation of the expected number of outliers.

As disclosed herein, assumption of independence of variables in multivariate data may not be required. A distribution for the multivariate input data may be unknown, and the disclosed system may detect outliers as long as the dataset is distributed in a way that a distance measure may be determined.

Although specific examples have been illustrated and described herein, especially as related to numerical data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system for detecting outliers in a multivariate dataset, the system comprising:
a distance generator to determine Mahalanobis distances for data elements of streaming multivariate input data, the Mahalanobis distance of a given data element being indicative of a measure of distance of the given data element from a probability distribution associated with the streaming multivariate input data,
wherein the streaming multivariate input data includes multiple vectors;
a filter module to:
select a cohesive portion of the streaming multivariate input data by minimizing the Mahalanobis distances, and
identify candidate outliers to be data elements not in the cohesive portion of the streaming multivariate input data;
an outlier detector to automatically detect outliers of the candidate outliers, the automatic detection based on median absolute deviations of the Mahalanobis distances for data elements of the streaming multivariate input data, and a modified z-score;
a display module to generate a visual representation of the detected outliers, the cohesive portion of the streaming multivariate input data and the candidate outliers being progressively analyzed as the streaming multivariate input data is being streamed; and
a communication device to transmit the visual representation of the detected outliers, the cohesive portion of the streaming multivariate input data and the candidate outliers being progressively analyzed as the streaming multivariate input data is being streamed to a remote computing device via an interactive graphical user interface.

2. The system of claim 1, wherein the filter module selects the cohesive portion of the streaming multivariate input data based on a minimum covariance determinant method.

3. The system of claim 1, wherein the probability distribution associated with the streaming multivariate input data is a Gaussian distribution.

4. The system of claim 1, wherein the probability distribution associated with the streaming multivariate input data is a normal distribution.

5. The system of claim 1, wherein the outlier detector automatically detects the outliers based on an adjustable threshold.

6. The system of claim 1, wherein the streaming multivariate input data is categorical data, and the distance generator further converts the categorical data to numerical data.

7. The system of claim 1, wherein the distance generator determines the Mahalanobis distances based on a selected sub-plurality of variables of the streaming multivariate input data.

8. A method for detecting outliers in a multivariate dataset, the method comprising:
identifying a probability distribution associated with streaming multivariate input data,
wherein the streaming multivariate input data includes multiple vectors;
determining Mahalanobis distances for data elements of the streaming multivariate input data, the Mahalanobis distance of a given data element indicative of a measure of distance of the given data element from the probability distribution;
selecting a cohesive portion of the streaming multivariate input data based on a minimum covariance determinant method;
identifying candidate outliers to be data elements not in the cohesive portion of the streaming multivariate input data;
automatically detecting outliers of the candidate outliers, the detection based on median absolute deviations of the Mahalanobis distances for data elements of the streaming multivariate input data, and a modified z-score;
providing a visual representation of the detected outliers, the cohesive portion of the streaming multivariate input data and the candidate outliers being progressively analyzed as the streaming multivariate input data is being streamed; and
transmitting the visual representation of the detected outliers, the cohesive portion of the streaming multivariate input data and the candidate outliers being progressively analyzed as the streaming multivariate input data is being streamed to a remote computing device via an interactive graphical user interface.

9. The method of claim 8, wherein the probability distribution associated with the streaming multivariate input data is a Gaussian distribution.

10. The method of claim 8, wherein detecting the outliers of the candidate outliers is based on an adjustable threshold.

11. The method of claim 8, wherein the streaming multivariate input data is categorical data, and the method further includes converting the categorical data to numerical data.

12. The method of claim 8, wherein the method further includes determining the Mahalanobis distances based on a selected sub-plurality of variables of the streaming multivariate input data.

13. The method of claim 8, wherein selecting the cohesive portion of the streaming multivariate input data is based on a minimum covariance determinant method.

14. A non-transitory computer readable medium comprising executable instructions to:
determine Mahalanobis distances for data elements of streaming multivariate input data, the Mahalanobis distance of a given data element indicative of a measure of distance of the given data element from a probability distribution associated with the streaming multivariate input data,
wherein the streaming multivariate input data includes multiple vectors;
select a cohesive portion of the streaming multivariate input data by minimizing the Mahalanobis distances;
identify candidate outliers to be data elements not in the cohesive portion of the streaming multivariate input data;
automatically detect outliers of the candidate outliers, the automatic detection based on median absolute deviations of the Mahalanobis distances for data elements of the streaming multivariate input data, and a modified z-score;

generate a visual representation of the detected outliers for display, the cohesive portion of the streaming multivariate input data and the candidate outliers being progressively analyzed as the streaming multivariate input data is being streamed; and transmit the visual representation of the detected outliers, the cohesive portion of the streaming multivariate input data and the candidate outliers being progressively analyzed as the streaming multivariate input data is being streamed to a remote computing device via an interactive graphical use interface.

15. The computer readable medium of claim 14, wherein the instructions to select the cohesive portion include further instructions to select the cohesive portion based on a minimum covariance determinant method.

16. The computer readable medium of claim 14, wherein the probability distribution associated with the streaming multivariate input data is a Gaussian distribution.

17. The computer readable medium of claim 14, wherein the probability distribution associated with the streaming multivariate input data is a normal distribution.

18. The computer readable medium of claim 14, wherein the instructions to automatically detect outliers of the candidate outliers include further instructions to detect the outliers based on an adjustable threshold.

19. The computer readable medium of claim 14, wherein the streaming multivariate input data is categorical data, and the instructions to determine the Mahalanobis distances include further instructions to convert the categorical data to numerical data.

20. The computer readable medium of claim 14, wherein the instructions to determine the Mahalanobis distances is based on a selected sub-plurality of variables of the streaming multivariate input data.

\* \* \* \* \*